United States Patent
Kuriyama

(10) Patent No.: US 8,526,742 B2
(45) Date of Patent: Sep. 3, 2013

(54) IMAGE PROCESSING APPARATUS, METHOD, AND PROGRAM THAT CLASSIFIES DATA OF IMAGES

(75) Inventor: Yuji Kuriyama, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 159 days.

(21) Appl. No.: 13/171,980

(22) Filed: Jun. 29, 2011

(65) Prior Publication Data

US 2012/0002878 A1 Jan. 5, 2012

(30) Foreign Application Priority Data

Jun. 30, 2010 (JP) ................. 2010-149665

(51) Int. Cl.
*G06K 9/46* (2006.01)
*G06K 9/62* (2006.01)

(52) U.S. Cl.
USPC .......................................... 382/195; 382/224

(58) Field of Classification Search
None
See application file for complete search history.

(56) References Cited

U.S. PATENT DOCUMENTS

| | | | |
|---|---|---|---|
| 5,781,650 A * | 7/1998 | Lobo et al. ................... | 382/118 |
| 6,661,906 B1 * | 12/2003 | Kawade et al. ............... | 382/118 |
| 6,829,395 B2 * | 12/2004 | Alm .............................. | 382/305 |
| 7,522,773 B2 * | 4/2009 | Gallagher et al. ............ | 382/224 |
| 7,822,233 B2 | 10/2010 | Nagaoka et al. | |
| 2002/0067856 A1 * | 6/2002 | Fujii et al. ..................... | 382/218 |
| 2003/0128877 A1 * | 7/2003 | Nicponski .................... | 382/224 |
| 2004/0247177 A1 * | 12/2004 | Rowe et al. ................... | 382/159 |
| 2005/0008264 A1 * | 1/2005 | Iida et al. ...................... | 382/305 |
| 2006/0198559 A1 * | 9/2006 | Manico et al. ................ | 382/305 |
| 2006/0251339 A1 * | 11/2006 | Gokturk et al. ............... | 382/305 |
| 2008/0080745 A1 * | 4/2008 | Vanhoucke et al. .......... | 382/118 |
| 2008/0253662 A1 * | 10/2008 | Funaki et al. ................. | 382/209 |
| 2009/0116752 A1 * | 5/2009 | Isomura et al. ............... | 382/217 |
| 2010/0128939 A1 * | 5/2010 | Stubler ......................... | 382/118 |
| 2010/0310135 A1 | 12/2010 | Nagaoka et al. | |

FOREIGN PATENT DOCUMENTS

JP 6-333023 A 12/1994
JP 2005-174308 A 6/2005

* cited by examiner

*Primary Examiner* — Stephen R Koziol
*Assistant Examiner* — Jonathan S Lee
(74) *Attorney, Agent, or Firm* — Holtz, Holtz, Goodman & Chick, PC

(57) ABSTRACT

In an image processing apparatus, a face detection unit 61 detects a face region in a target image. An age recognition unit 62 recognizes the age of a subject based on data of the face region. A similar image search unit 63 searches for data of an existing image having a face region similar to the detected face region as similar image data. A date comparing unit 65, when the age of the subject is confirmed to be within a first range by an age confirmation unit 64, acquires a time difference between the capture dates of the target image data and the similar image data and compares the time difference with a second range. A grouping unit 66, when the time difference is within the second range, classifies the target image data into the same group as the group to which the similar image data belongs.

6 Claims, 4 Drawing Sheets

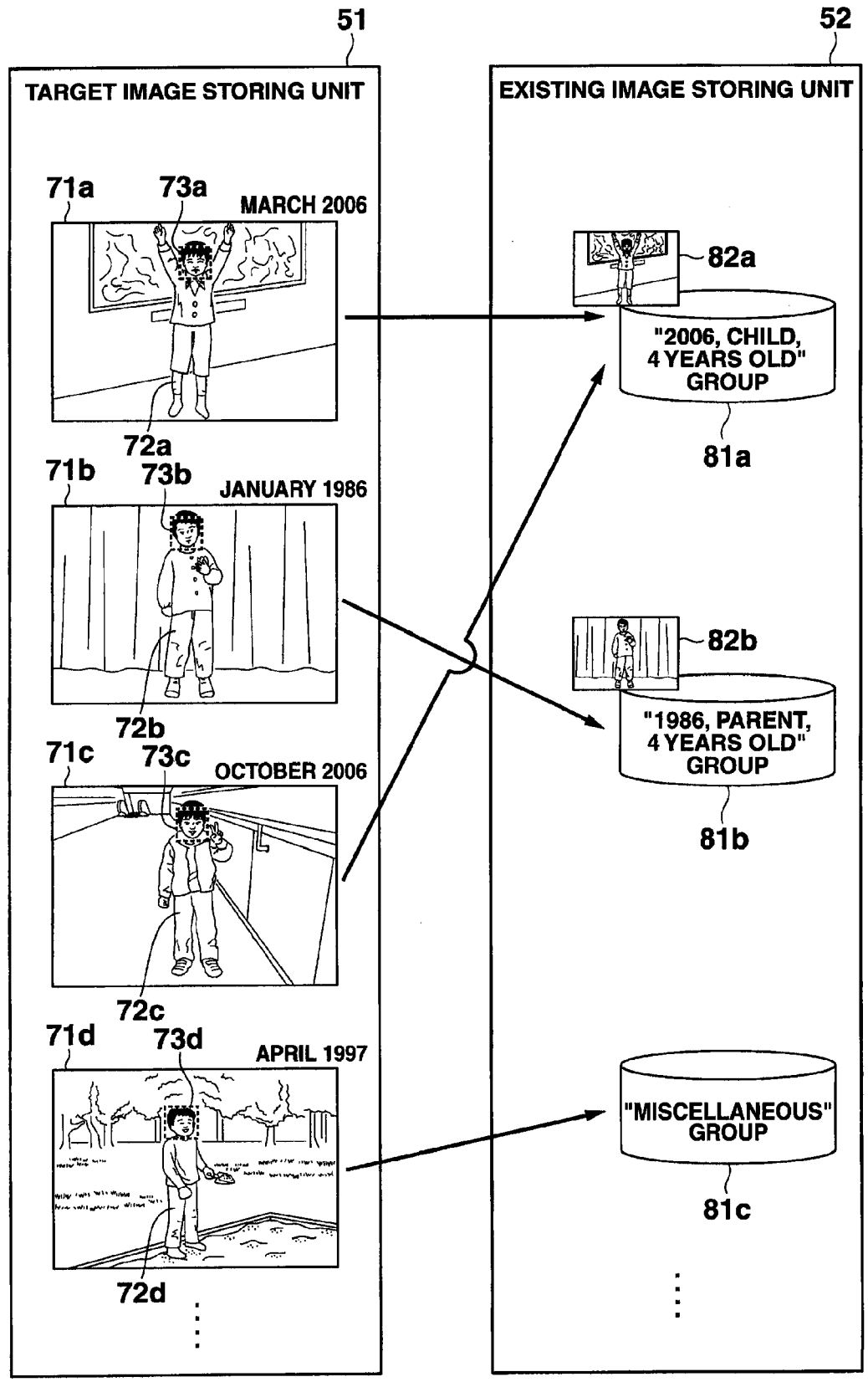

IMAGE PROCESSING APPARATUS, METHOD, AND PROGRAM THAT CLASSIFIES DATA OF IMAGES

The present application is based on and claims the benefit of priority from Japanese Patent Application No. 2010-149665 filed on Jun. 30, 2010, the content of which is incorporated herein by reference.

BACKGROUND OF THE INVENTION

1. Field of the Invention

The present invention relates to technology that can classify data of images respectively including different subjects having similar faces, such as parent and child or siblings, into different groups with high accuracy.

2. Related Art

Recently, memory storage sizes are increasing, and digital cameras have become capable of storing data of an extremely large number of images.

In such cases, with the increase in the number of stored images, operations of searching for data of a desired image and organizing data of images that have been searched for is becoming difficult.

In order to reduce such operational difficulty, there is known a technique that extracts a region of a face (hereinafter, referred to as "face region") included in an image by way of face detection technology, associates data of the image from which a face is detected with a specific group, and thereby classifies data of a plurality of images into groups of respective subjects.

However, since data of different images from which identical or similar face regions are detected is classified into the same group, there may be cases in which a group assigned to a predetermined person happens to include image data of a different person having a similar face to the person.

For example, consideration is given to a case of classifying data of a first image including a predetermined person as a subject and data of a second image including a different person as a subject, who has a parent-child or sibling relationship with the predetermined person.

In this case, if both the first and second images are photographed at the same time, e.g., at the present time, since the two subjects are different in age, it is possible to classify data thereof into different groups. This is because, when comparing a first face region detected from the first image and a second face region detected from the second image, there are differences in the features due to age difference therebetween, more specifically, horizontal to vertical ratio of the faces, height of eyes on the faces, size of eyes, number of wrinkles, or recession of hair. Therefore, it is possible to classify data of the first and second images into different groups according to difference in such features.

However, in a case in which the predetermined person is, for example, a parent, the subject included in the first image is the parent at the age of 4, the different person is a child, and the subject included in the second image is the child at the age of 4, then it becomes difficult to classify data of such images into different groups. This is because the two subjects are the same in age, and there are no differences in features in terms of age difference as described above. Furthermore, faces of a parent and a child at the same age are most likely very similar. Therefore, in such a case, the respective data of the first and second images cannot be separated, and the first and second images may be classified into the same group of either the parent or the child.

For this reason, it is desired to realize a method capable of classifying data of images respectively including different subjects having similar faces such as parent and child or siblings into different groups at high accuracy.

SUMMARY OF THE INVENTION

It is an object of the present invention to classify data of images respectively including different subjects having similar faces into different groups, with high accuracy.

In order to attain the above described object, in accordance with a first aspect of the present invention, there is provided an image processing apparatus comprising: a face detection unit that detects a region including a face of a subject in a target image, as a face region, using data of a captured image that can identify a capture date thereof, as the data of the target image; an age recognition unit that recognizes the age of the subject in the target image based on the face region detected by the face detection unit; a similar image search unit that searches for data of an existing image having a face region similar to the face region detected by the face detection unit, as data of a similar image from among data of a plurality of existing images that can respectively identify capture dates thereof, each of which belongs to one of a plurality of groups; an age confirmation unit that confirms whether or not the age of the subject in the target image recognized by the age recognition unit is within a first range; a date comparing unit that, in a case in which the age confirmation unit confirms that the age of the subject in the target image is within the first range, acquires a time difference between a first capture date of the data of the target image and a second capture date of the data of the similar image found by the similar image search unit, and compares the time difference with a second range; and a grouping unit that classifies the data of the target image into the same group as the group to which the data of the similar image belongs, in a case in which the time difference is within the second range, as a result of a comparison by the date comparing unit.

In order to attain the above described object, in accordance with a second aspect of the present invention, there is provided an image processing method carried out by an image processing apparatus for classifying data of a captured image that can identify a capture date thereof, the method comprising the steps of: detecting a region including a face of a subject in a target image, as a face region, using data of a captured image that can identify a capture date thereof, as the data of the target image; recognizing age of the subject in the target image based on the face region thus detected; searching for data of an existing image having a face region similar to the face region thus detected, as data of a similar image, from among data of a plurality of existing images that can respectively identify capture dates thereof, each of which belongs to one of a plurality of groups; confirming whether or not the age of the subject in the target image thus recognized is within a first range; acquiring, in a case in which it is confirmed that the age of the subject in the target image is within the first range, a difference between a first capture date of the data of the target image and a second capture date of the data of the similar image thus found, and comparing the difference with a second range; and classifying the data of the target image into the same group as the group to which the data of the similar image belongs, in a case in which the difference is within the second range, as a result of a the comparison.

In order to attain the above described object, in accordance with a third aspect of the present invention, there is provided a non-transitory storage medium having stored therein a program executable by a computer that controls an image processing apparatus that carries out image processing on data of a captured image that can identify a capture date thereof, causing the computer to realize functions of: detecting a region including a face of a subject in a target image, as a face region, using data of the captured image that can identify a capture date thereof as the data of the target image; recognizing age of the subject in the target image based on the face region thus detected; searching for data of an existing image having a face region similar to the face region thus detected, as data of a similar image, from among data of a plurality of existing images that can respectively identify capture dates thereof, each of which belongs to one of a plurality of groups; confirming whether or not the age of the subject in the target image thus recognized is within a first range; acquiring, in a case in which it is confirmed that the age of the subject in the target image is within the first range, a difference between a first capture date of the data of the target image and a second capture date of the data of the similar image thus found, and comparing the difference with a second range; and classifying the data of the target image into the same group as the group to which the data of the similar image belongs, in a case in which the difference is within the second range, as a result of the comparison.

BRIEF DESCRIPTION OF THE DRAWINGS

FIG. 4 is a diagram illustrating an outline of images grouped by an image processing unit of the image processing apparatus shown in FIG. 2.

DETAILED DESCRIPTION OF THE INVENTION

The following describes an embodiment of the present invention with reference to the drawings.

Figure 1:
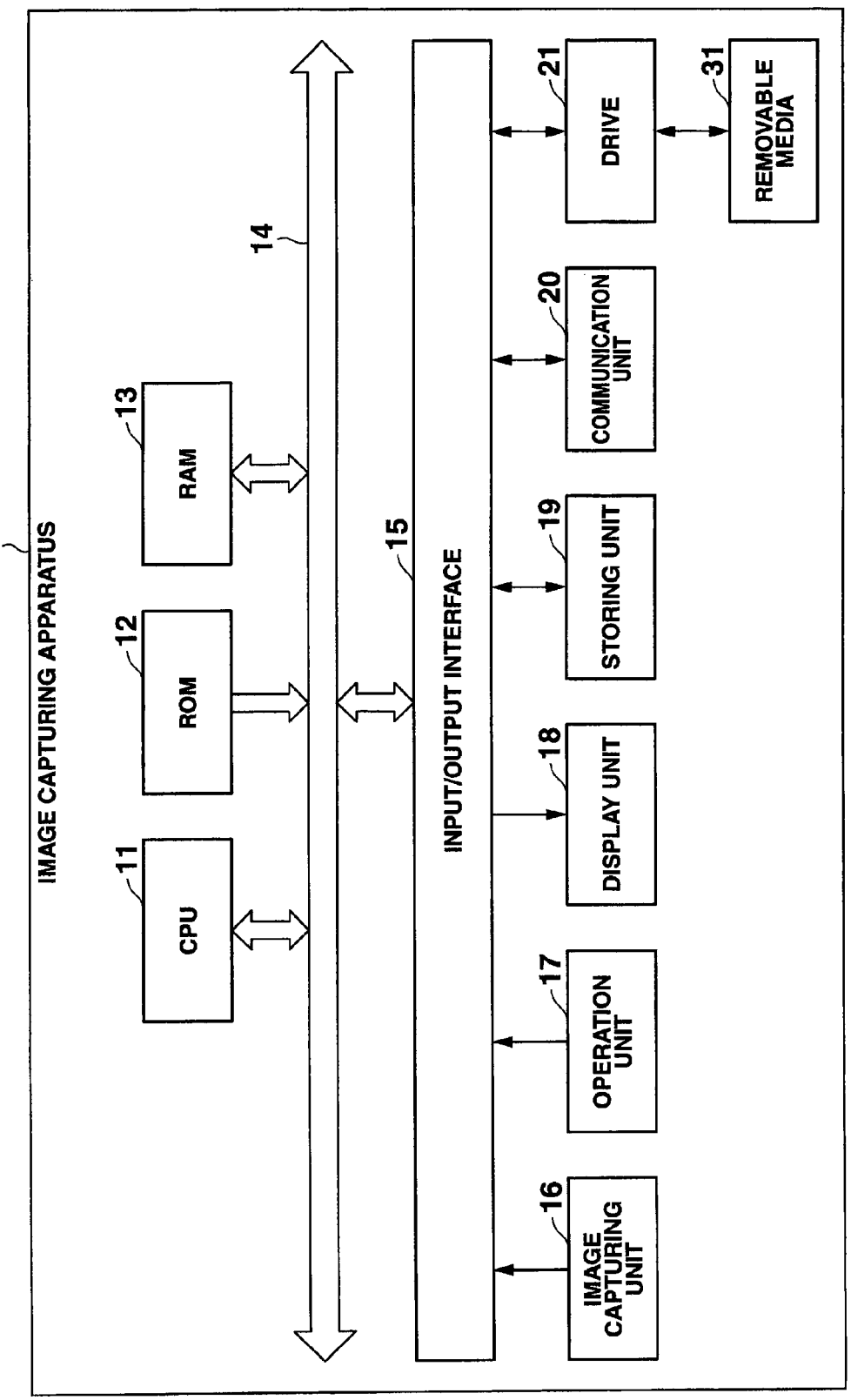
FIG. 1 is a block diagram showing a hardware configuration of an image processing apparatus according to one embodiment of the present invention.

FIG. 1 is a block diagram showing a hardware configuration of an image capturing apparatus 1 as one embodiment of the image processing apparatus according to the present invention. The image capturing apparatus 1 can be configured by a digital camera, for example.

The image capturing apparatus 1 is provided with a CPU (Central Processing Unit) 11, a ROM (Read Only Memory) 12, a RAM (Random Access Memory) 13, a bus 14, an input/output interface 15, an image capturing unit 16, an operation unit 17, a display unit 18, a storing unit 19, a communication unit 20, and a drive 21.

The CPU 11 executes various processes according to programs that are stored in the ROM 12. Alternatively, the CPU 11 executes various processes according to programs that are loaded from the storing unit 19 to the RAM 13.

The RAM 13 also stores data and the like, necessary for the CPU 11 to execute the various processes, as appropriate.

For example, according to the present embodiment, programs for implementing functions of a face detection unit 61, an age recognition unit 62, a similar image search unit 63, an age confirmation unit 64, a date comparing unit 65, and a grouping unit 66 shown in FIG. 2, which will be described later, are stored in the ROM 12 or the storing unit 19. Therefore, each of the functions of the face detection unit 61, the age recognition unit 62, the similar image search unit 63, the age confirmation unit 64, the date comparing unit 65, and the grouping unit 66 can be realized by the CPU 11 executing processes according to these programs.

The CPU 11, the ROM 12, and the RAM 13 are connected to one another via the bus 14. The bus 14 is also connected with the input/output interface 15. The image capturing unit 16, the operation unit 17, the display unit 18, the storing unit 19, and the communication unit 20 are connected to the input/output interface 15.

The image capturing unit 16 is provided with an optical lens unit and an image sensor, which are not illustrated in the drawings.

The optical lens unit is configured by a light condensing lens such as a focus lens, a zoom lens, and the like, for example, to photograph a subject.

The focus lens is a lens that forms an image of a subject on the light receiving surface of the image sensor. The zoom lens is a lens for freely changing a focal point within a predetermined range.

The optical lens unit includes peripheral circuits that adjust parameters such as focus, exposure, white balance, and the like, as necessary.

The image sensor is configured by an optoelectronic conversion device, an AFE (Analog Front End), and the like.

The optoelectronic conversion device is configured by a CMOS (Complementary Metal Oxide Semiconductor) type optoelectronic conversion device, or the like, for example. An image of a subject is made incident through the optical lens unit on the optoelectronic conversion device. The optoelectronic conversion device optoelectronically converts (i.e., captures) an image of a subject as an image signal at a predetermined interval, stores the image signal thus converted, and sequentially supplies the stored image signal to the AFE as an analog signal.

The AFE executes various kinds of signal processing such as A/D (Analog/Digital) conversion on the analog image signal. As a result of the various kinds of signal processing, a digital signal is generated and outputted as an output signal from the image capturing unit 16.

Hereinafter, the output signal from the image capturing unit 16 is referred to as "data of a captured image". Thus, data of a captured image is outputted from the image capturing unit 16 and provided as appropriate to the CPU 11 and the like.

The operation unit 17 is configured by various buttons and receives operation instruction from a user.

The display unit 18 is configured by a liquid crystal display and the like and displays various images.

The storing unit 19 is configured by a DRAM (Dynamic Random Access Memory) and the like and temporarily stores data of captured images outputted from the image capturing unit 16. Also, the storing unit 19 stores various kinds of data necessary for various kinds of image processing, such as image data, values of various flags, threshold values, and the like.

The communication unit 20 controls communication with other devices (not shown) via networks including the Internet.

The input/output interface 15 is connected with the drive 21 as necessary. Removable media 31 such as a magnetic disk, an optical disk, a magneto-optical disk, or a semiconductor memory is mounted to the drive 21 as appropriate. Also, programs read from the removable media 31 via the drive 21 are installed in the storing unit 19 as necessary. Furthermore, similar to the storing unit 19, the removable media 31 can store various kinds of data such as image data and the like, stored in the storing unit 19.

The image capturing apparatus 1 having such a configuration can carry out the following series of processes.

The image capturing apparatus 1 detects a region including a face of a subject as a face region from an image (hereinafter, referred to as "target image"), using data of an image to be grouped.

The image capturing apparatus 1 recognizes the age of the subject based on data of the face region.

The image capturing apparatus 1 extracts, from among data of images (hereinafter, referred to as "existing image") that are already classified into predetermined groups, data of an existing image having a face region similar to the face region that has been detected.

In a case in which the age of the subject in the target image is within a predetermined range and a difference between capture dates of the target image data and the existing image data extracted above is within a predetermined range, the image capturing apparatus 1 classifies the target image data into the same group as the existing image data. Otherwise, the image capturing apparatus 1 classifies the target image data into a group other than the existing image data.

Such a series of processes is hereinafter referred to as "grouping determination processing".

Figure 2:
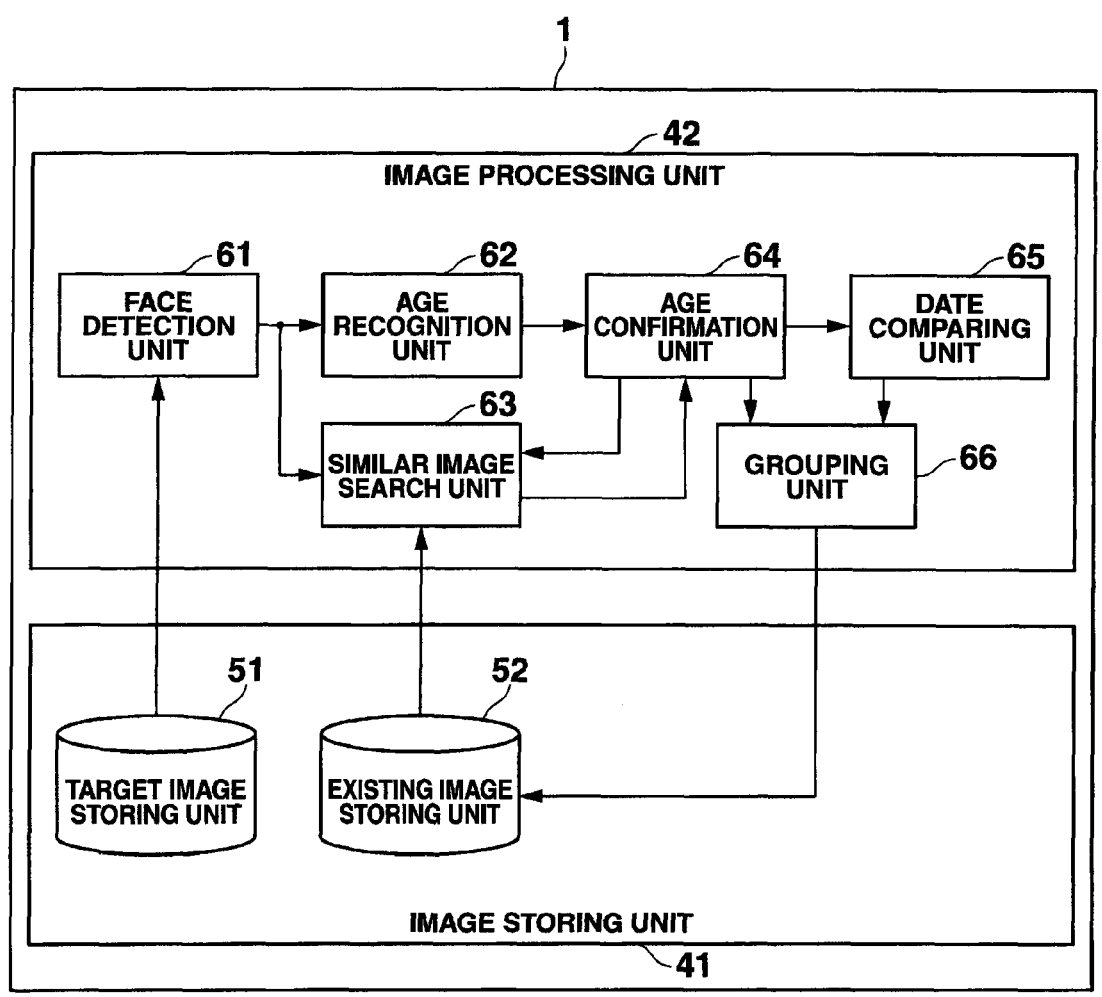
FIG. 2 is a block diagram showing a functional configuration of the image processing apparatus shown in FIG. 1 to carry out grouping determination processing.

FIG. 2 is a block diagram showing a functional configuration of the image capturing apparatus 1 that carries out the grouping determination processing.

As shown in FIG. 2, the image capturing apparatus 1 is provided with an image storing unit 41, and an image processing unit 42.

The image storing unit 41 includes a target image storing unit 51, and an existing image storing unit 52.

The image processing unit 42 includes a face detection unit 61, an age recognition unit 62, a similar image search unit 63, an age confirmation unit 64, a date comparing unit 65, and a grouping unit 66.

In the present embodiment, the image storing unit 41, i.e., the target image storing unit 51 and the existing image storing unit 52 are configured as an area in the RAM 13, the storing unit 19, or the removable media 31, from among the constituent elements shown in FIG. 1.

The target image storing unit 51 stores image data acquired by the image capturing unit 16 or the like that captures a subject as target image data. At this time, the target image storing unit 51 stores meta information indicating a capture date of the target image data, in association with the target image data.

More specifically, in the present embodiment, the target image data is included in an EXIF (Exchangeable Image File Format) file. Such a file including target image data is hereinafter referred to as a "target image file". The target image file may include, as well as target image data, various kinds of meta information related to the target image data. Therefore, in the present embodiment, date information at the time of capturing is included in the target image file as meta information indicating the capture date. Such a target image file is stored in the target image storing unit 51.

The image data stored as target image data in the target image storing unit 51 is not limited to image data captured by the image capturing unit 16 but may be any kind of image data so long as a capture date thereof is recognizable, and may include, for example, image data acquired from outside via the communication unit 20.

The existing image storing unit 52 stores data of a plurality of images classified to respective groups according to person and age in advance, as existing image data, in such a group structure. Also, the existing image storing unit 52 stores meta information indicating the capture date of the existing image data associated therewith.

More specifically, in the present embodiment, the existing image data is in EXIF format as well as the target image data. Such an EXIF file including the existing image data and meta information indicating the capture dates thereof is, hereinafter, referred to as "existing image file" in order to distinguish it from a target image file.

Compared to such an image storing unit 41, each of the constituent elements of the image processing unit 42, i.e., each of the face detection unit 61, the age recognition unit 62, the similar image search unit 63, the age confirmation unit 64, the date comparing unit 65, and the grouping unit 66 is configured as a combination of the CPU 11 as hardware, and programs stored in the ROM 12 and the like as software, from among the constituent elements shown in FIG. 1.

The face detection unit 61 reads target image data from the target image storing unit 51 at predetermined timing such as, for example, the time of a grouping instruction operation, which will be described later, and detects a region including a face of a subject in the target image as a face region.

More specifically, in the present embodiment, the face detection unit 61 first extracts characteristic points of a face such as end points of eyebrows, eyes, nose, and mouth, contour points of the face, the top point of the head, and the bottom point of the chin, from the target image data by way of the characteristic points extraction processing disclosed in Japanese Patent Application Publication No. 2001-16573 and the like. The face detection unit 61 determines regions of eyebrows, eyes, nose, and mouth and the boundary thereof as a contour, acquires position information thereof, and thereby detects a face region.

A method of detecting a face region applicable to the face detection unit 61 is not limited to the present embodiment, but any kind of method that is already in the public domain or that will be developed in the future may be used.

The face detection unit 61 outputs a result of detecting a face region and the target image data to the age recognition unit 62. Here, as the detection result of the face region, the face detection unit 61 outputs information that can identify the face region from the target image, for example, or more specifically, position information that can identify the position of the face region, for example.

Furthermore, the face detection unit 61 outputs the target image data and information of the capture date thereof to the similar image search unit 63.

In a case in which no face region is detected, for example, because no subject is included in the target image, the face detection unit 61 supplies the target image data and capture date information thereof together with information that no face region is detected to the grouping unit 66 via the age recognition unit 62 and the age confirmation unit 64.

The age recognition unit 62 recognizes the age of the subject included in the target image based on data of the face region in the target image detected by the face detection unit 61.

More specifically, in the present embodiment, the age recognition unit 62 first detects data indicative of features of face (hereinafter, referred to as "face feature data") by way of age presumption processing disclosed by Japanese Patent Application Publication No. 1994-333023. The face feature data may include, for example, data of horizontal to vertical ratio of face, height of eyes on face, size of eyes, number of wrinkles, recession of hair, and the like. Next, the age recognition unit 62 generates data of a renewed face region by combining pattern data of existing face parts based on the face feature data and recognizes the age of the subject based on the data of the renewed face region.

A method of age recognition applicable to the age recognition unit 62 is not limited to the method of the present embodiment, but any kind of method that is already public domain or that will be developed in the future may be used.

The age recognition unit 62 outputs the target image data and age information thus recognized to the age confirmation unit 64.

The similar image search unit 63 searches for data of an existing image (hereinafter, referred to as "similar image") having a face region similar to the face region of the target image detected by the face detection unit 61 from among data of a plurality of existing images stored in the existing image storing unit 52.

Here, as a method of determining whether or not face regions are similar to each other, a method is employed in the present embodiment such that, computing similarity for each of a plurality of features in the face regions and using overall similarity of the plurality of features, it is determined whether or not the face regions are similar to each other. However, the method of determining whether or not the face regions are similar to each other is not limited to the method of the present embodiment, and any kind of method that is already in the public domain or that will be developed in the future may be used.

The similar image search unit 63 supplies the search result of similar image data to the age confirmation unit 64.

There are cases, details of which will be described later, where the age confirmation unit 64, upon receiving the search result, issues a request for acquisition of information (hereinafter, referred to as "similar image information") indicative of the capture date of the similar image data and the group to which the similar image data belongs.

In this case, the similar image search unit 63 acquires the similar image information from the existing image storing unit 52 and outputs it along with the target image data and information of the capture date thereof.

In a case in which similar image data is found (the search result to that effect is received) by the similar image search unit 63, the age confirmation unit 64 confirms whether or not the age of the subject in the target image recognized by the age recognition unit 62 falls within a predetermined range (hereinafter, referred to as "target age range").

More specifically, in the present embodiment, it is assumed that the target age range is between 0 and 5 years old. That is, the age confirmation unit 64 confirms whether or not the age of the subject in the target image is within the range of 0 to 5 years old, i.e., the age does not exceed 5 years old.

In a case in which it is confirmed that the age of the subject in the target image is within the target age range (0 to 5 years old), the age confirmation unit 64 issues an acquisition request for the similar image information to the similar image search unit 63, as described above. When the similar image search unit 63 that has received the acquisition request outputs the similar image information, i.e., information indicating the group to which the similar image data belongs and the capture date thereof, the age confirmation unit 64 acquires the similar image information. Then, the age confirmation unit 64 outputs the target image data, the capture date information thereof, and the similar image information (information indicating the capture date of the similar image data and the group thereof acquired from the similar image search unit 63) to the date comparing unit 65.

On the other hand, in a case in which it is confirmed that the age of the subject in the target image is outside the target age range (0 to 5 years old), the age confirmation unit 64 outputs the target image data and the capture date information thereof to the grouping unit 66.

Moreover, in a case in which no similar image is found by the similar image search unit 63 (the search result to that effect is received), the age confirmation unit 64 outputs the target image data and the capture date information thereof to the grouping unit 66 without carrying out the processing of confirming age.

In the case in which the age of the subject in the target image is within the target age range (0 to 5 years old), the age confirmation unit 64 provides the target image data, the capture date thereof, and the similar image information (information indicating the capture date and the group of the similar image data) to the date comparing unit 65.

Then, the date comparing unit 65 compares the capture date of the target image data with that of the similar image data.

More specifically, in the present embodiment, the date comparing unit 65 computes time difference between the capture dates of the target image data and the similar image data and determines whether or not the time difference is within a specified time interval. Here, the specified time interval refers to a time interval arbitrarily specifiable by a user's operation on the operation unit 17.

When it is determined that the time difference between the capture dates of the target image data and the similar image data is within the specified time interval, the date comparing unit 65 outputs to the grouping unit 66 the target image data and the information of the group to which the data of the similar image to the target image belongs.

On the other hand, when it is determined that the time difference between capture dates of the target image data and the similar image data exceeds the specified time interval, the date comparing unit 65 compares the capture dates of the target image data and another similar image data. Such a comparing process by the date comparing unit 65 is repeated until data of a similar image is found such that the time difference between capture dates falls within the specified time interval, or until no more similar image data is found.

The grouping unit 66 classifies target image data into a predetermined group and stores the target image data in the existing image storing unit 52 as data belonging to the classified group.

More specifically, in the present embodiment, in the case in which the time difference between capture dates of the target image data and the similar image data is within the specified time interval, the date comparing unit 65 provides to the grouping unit 66 the target image data and the information of the group to which the similar image data thereof belongs. In this case, the grouping unit 66 classifies the target image data into the group to which the similar image data belongs by attaching the same tag information to the target image data as the similar image data, for example. The grouping unit 66 stores in the existing image storing unit 52 the target image data as data belonging to the group.

Processing in other cases will be described later with reference to the flowchart of FIG. 3.

In the following, the grouping determination processing carried out by the image capturing apparatus 1 shown in FIG. 2 will be described with reference to FIG. 3.

Figure 3:
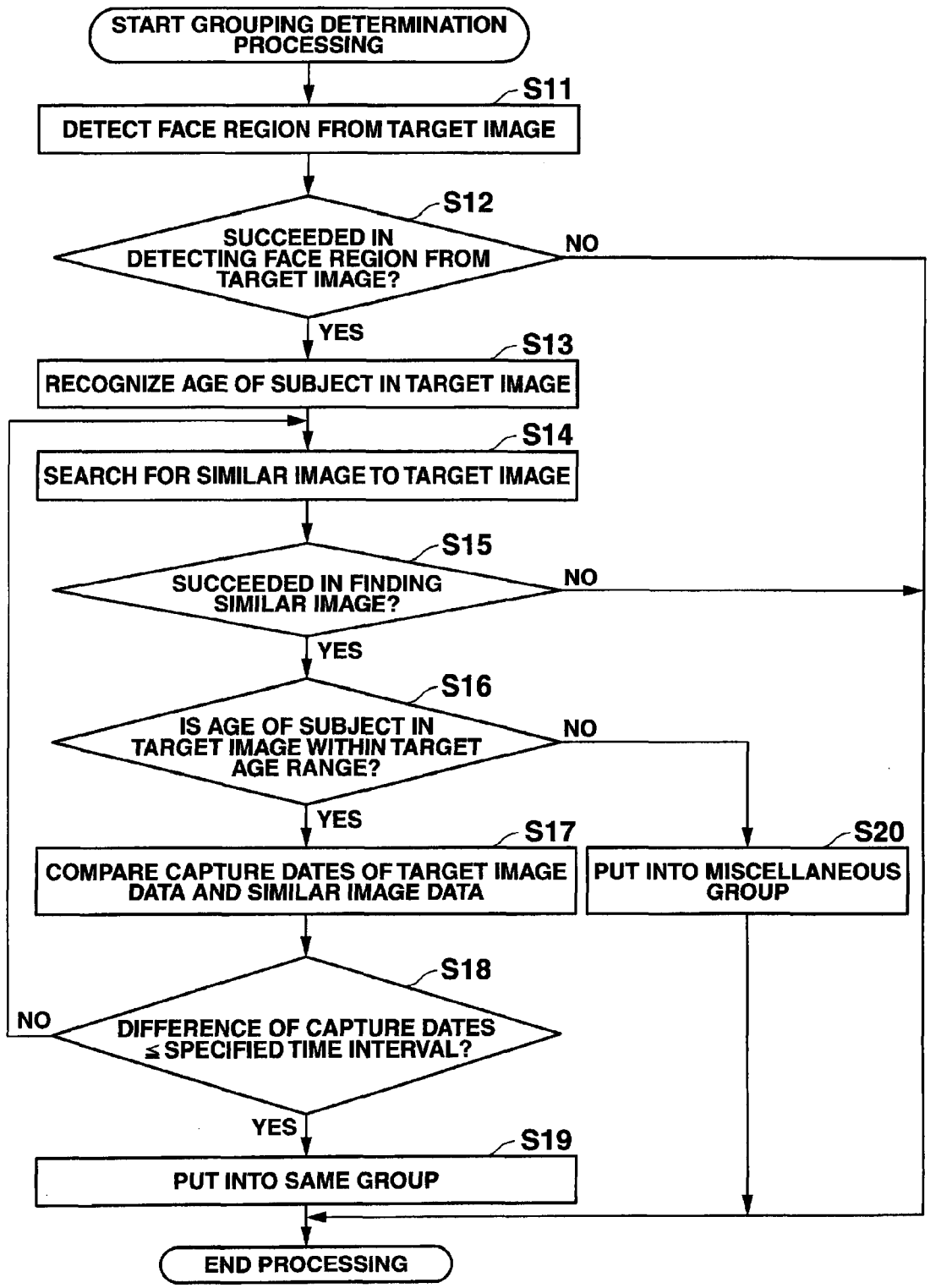
FIG. 3 is a flowchart showing flow of the grouping determination processing carried out by the image processing apparatus shown in FIG. 2.

FIG. 3 is a flowchart showing flow of the grouping determination processing.

The grouping determination processing starts with a user's instruction operation on the operation unit 17 to classify target image data, for example, and the following processing is carried out.

In step S11 of FIG. 3, the face detection unit 61 reads target image data from the target image storing unit 51 and attempts to detect a face region therefrom.

In step S12, the grouping unit 66 determines whether or not a face region is detected from the target image.

In a case in which no face region is detected by the face detection unit 61 due to a reason such as that no subject is included in the target image, NO is determined in step S12, and the grouping determination processing ends. In this case, the target image data is stored in the existing image storing unit 52 without being classified to any group.

On the other hand, in a case in which a face region is detected by the face detection unit 61, YES is determined in step S12, and control proceeds to step S13.

In step S13, the age recognition unit 62 recognizes the age of the subject in the target image based on the face region data detected by the face detection unit 61.

In step S14, the similar image search unit 63 searches for data of an existing image having a face region similar to the face region detected by the face detection unit 61 as data of a similar image to the target image.

In step S15, the grouping unit 66 determines whether or not any similar image is found.

In a case in which no similar image is found, NO is determined in step S15, and the grouping determination processing ends. In this case, the data of the target image is stored in the existing image storing unit 52 without being classified to any group.

On the other hand, in a case in which one or more similar images are found by the similar image search unit 63, YES is determined in step S15, and control proceeds to step S16.

In step S16, the age confirmation unit 64 determines whether or not the age of the subject in the target image recognized by the age recognition unit 62 is within a predetermined target age range.

The target age range is an age range, which can be specified by a user operating the operation unit 17 before carrying out the grouping determination processing, as described above, and is set to 0 to 5 years old in the present embodiment.

In a case in which the age of the subject in the target image is outside the target age range, i.e., exceeds 5 years old, NO is determined in step S16, and control proceeds to step S20.

In step S20, the grouping unit 66 classifies the target image data into a "miscellaneous" group by attaching tag information of "miscellaneous" to the target image data, for example. With this, the grouping determination processing ends. In this case, the target image data is stored in the existing image storing unit 52 along with the capture date information thereof as being classified to the miscellaneous group.

On the other hand, in a case in which the age of the subject in the target image is within the target age range, i.e., does not exceed 5 years old, YES is determined in step S16, and control proceeds to step S17.

In step S17, the date comparing unit 65 compares the capture date of the similar image data found by the similar image search unit 63 with the capture date of the target image data. More specifically, the date comparing unit 65 computes a time difference between the capture dates of the target image data and the similar image data.

In step S18, the date comparing unit 65 determines whether or not the time difference between the capture dates of the target image data and the similar image data is within the specified time interval.

What is meant by "the time difference between the capture dates of the target image data and the similar image data exceeds the specified time interval" is that the subjects of the target image and the similar image have similar faces beyond a long period over the specified time interval, e.g., 2 years. This means that the subjects of the target image and the similar image are most likely different people but have a close relationship such as parent-child or siblings.

Therefore, in the case in which the time difference between the capture dates of the target image data and the similar image data exceeds the specified time interval, NO is determined in step S18, control goes back to step S14, another similar image is searched for, and the processes thereafter are repeated.

After that, as a result of having repeated the processes of steps S14 to S18 on another similar image, if it happens that the time difference between capture dates of the target image data and the similar image data is within the specified time interval, then it is determined that the subjects of the target image and the similar image have similar faces for a short period within the specified time interval. This means that the subjects of the target image and the similar image can be determined to be the same person.

Therefore, in the case in which the time difference between the capture dates of the target image data and the similar image data is within the specified time interval, YES is determined in step S18, and control proceeds to step S19.

In step S19, the grouping unit 66 classifies the target image data into the same group as the similar image data and stores the target image data in the existing image storing unit 52 as data belonging to the group. More specifically, the grouping unit 66 classifies the target image data into the same group as the similar image data by attaching tag information indicating the same group as the similar image data to the target image data, for example. Then, the grouping unit 66 stores the target image data in the existing image storing unit 52 as data belonging to the group.

With this, the grouping determination processing ends.

In the following, a more specific description of the grouping determination processing will be given, with reference to FIG. 4.

FIG. 4 is a diagram illustrating a specific processing result of the grouping determination processing.

In the example of FIG. 4, data of target images 71a, 71b, 71c, 71d, and so forth captured by the image capturing unit 16 is stored in the target image storing unit 41. Also, information that can identify capture dates of the target images, which are shown in upper right of the target images 71a, 71b, 71c, and 71d of FIG. 4, is assumed to be stored in the target image storing unit 51.

Furthermore, it is assumed that the subjects 72a and 72c included in the target images 71a and 71c are the same child, while the subject 72b included in the target image 71b is a parent, and the subject 72d included in the target image 71d is somebody other than the parent and child.

Furthermore, it is assumed that a "2006, child, 4 years old" group is created in advance in the existing image storing unit 52 to which a storing unit 81a (hereinafter, referred to as "child group storing unit 81a") that stores image data belonging to the group is provided in advance. It is assumed that data of one or more existing images including a 4 year old child as a subject thereof (only the existing image 82a is shown) are stored along with the capture date information thereof in the child group storing unit 81a.

Also, it is assumed that a "1986, parent, 4 years old" group is created in advance in the existing image storing unit 52 to which a storing unit 81b (hereinafter, referred to as "parent group storing unit 81b") that stores image data belonging to the group is provided in advance. It is assumed that data of one or more existing images including a parent at 4 years of age as a subject thereof (only the existing image 82b is shown) is stored along with capture date information thereof in the parent group storing unit 81b.

Also, a "miscellaneous" group is created in advance in the existing image storing unit 52 to which a storing unit 81c (hereinafter, referred to as "miscellaneous group storing unit 81c") that stores image data belonging to the group is provided in advance.

This means that, in the example of FIG. 4, it is assumed that the data of each of the target images 71a, 71b, 71c, 71d, and so forth is classified into one of the three groups, the "2006, child, 4 years old" group, the "1986, parent, 4 years old" group, and the "miscellaneous" group.

In step S11 of FIG. 3, it is assumed that data of the target image 71a has been read from the target image storing unit 51, and the face detection unit 61 has attempted to detect a face region.

In this case, since the face region 73a is detected as shown in FIG. 4, YES is determined in the process of step S12, and the age recognition unit 62 recognizes that the age of the subject (child) of the target image is 4 years old based on data of the face region 73a in the process of step S13.

In the process of step S14, the similar image search unit 63 searches for data of an existing image having a face region similar to the face region 73a as data of a similar image to the target image from among data of a plurality of existing images stored in the existing image storing unit 52.

Though the target and the order of the search are not limited, for ease of description, it is assumed here that the child group storing unit 81a, the parent group storing unit 81b, and the miscellaneous group storing unit 81c are searched for as the target of search, in this order.

The existing images having face regions similar to the face region 73a includes the existing image 82a, data of which is stored in the child group storing unit 81a, the existing image 82b, data of which is stored in the parent group storing unit 81b, and the like.

However, since the child group storing unit 81a is firstly searched for, the data of the existing image 82a, for example, is to be found as data of a similar image to the target image 71a.

In this case, YES is determined in the process of step S15, and the age confirmation unit 64 determines whether or not the age (4 years old) of the subject (child) of the target image 71a is within a predetermined target age range in the process of step S16.

Since it has been assumed here that the target age range is set between 0 and 5 years old as described above, YES is determined in the process of step S16, and control proceeds to step S17.

In the process of step S17, the date comparing unit 65 computes a time difference between the capture dates of the data of the target image 71a and the data of the similar image 82a.

As shown in FIG. 4, the capture date of the data of the target image 71a is March 2006. On the other hand, the capture date of the data of the similar image 82a is, though not explicitly shown in FIG. 4, at least in the year 2006, since the data of the similar image 82a belongs to the "2006, child, 4 years old" group. Therefore, the time difference is at most 9 months. Here, a description will be given assuming that the time difference is 9 months.

In the process of step S18, the date comparing unit 65 determines whether or not a time difference between the capture dates of the data of the target image 71a and the data of the similar image 82a is within the specified time interval.

Though the specified time interval can be arbitrarily specified by a user, as described above, since it suffices if parent and child are distinguishable, it is assumed that a considerably long interval of, for example, 10 years is specified here.

In this case, the time difference of 9 months is obviously shorter than the specified time interval of 10 years. This means that the subjects of the target image 71a and the similar image 82a have similar faces within a short period (of 9 months, in this case) not exceeding the specified time interval, and it can be determined that the subjects of the target image 71a and the similar image 82a are the same person, i.e., the child.

Thus, YES is determined in the process of step S18, the grouping unit 66 classifies the data of the target image 71a into the "2006, child, 4 years old" group and stores it in the child group storing unit 81a in the process of step S19.

With this, the grouping determination processing ends.

After that, it is assumed that the grouping determination processing starts again, the target image 71c is read from the target image storing unit 51, and the face detection unit 61 attempts to detect a face region in the process of step S11.

In this case, the target image 71c is processed exactly in the same way as the target image 71a. That is, in the end, the grouping unit 66 classifies the data of the target image 71c into the "2006, child, 4 years old" group and stores it in the child group storing unit 81a in the process of step S19.

With this, the grouping determination processing ends.

After that, it is assumed that the grouping determination processing starts over again, the target image 71b is read from the target image storing unit 51, and the face detection unit 61 attempts to detect a face region in the process of step S11.

In this case, since the face region 73b is detected as shown in FIG. 4, YES is determined in the process of step S12, and the age recognition unit 62 recognizes that the age of the subject (parent) of the target image is 4 years old based on data of the face region 73b in the process of step S13.

In the process of step S14, the similar image search unit 63 searches for data of an existing image having a face region similar to the face region 73b as data of a similar image to the target image from among data of a plurality of existing images stored in the existing image storing unit 52.

The existing images having face regions similar to the face region 73b includes the existing image 82a, data of which is stored in the child group storing unit 81a, and the existing image 82b, data of which is stored in the parent group storing unit 81b.

However, since the child group storing unit 81a is firstly searched for, the data of the existing image 82a, for example, is to be found as data of a similar image to the target image 71b.

In this case, YES is determined in the process of step S15, and the age confirmation unit 64 determines whether or not the age (4 years old) of the subject (parent) of the target image 71b is within a predetermined target age range in the process of step S16.

Since it has been assumed here that the target age range is set between 0 and 5 years old as described above, YES is determined in the process of step S16, and control proceeds to step S17.

In the process of step S17, the date comparing unit 65 computes a time difference between the capture dates of the data of the target image 71b and the data of the similar image 82a.

As shown in FIG. 4, the capture date of the data of the target image 71b is January 1986. On the other hand, the capture date of the data of the similar image 82a is, though not explicitly shown in FIG. 4, at least in the year 2006, since the data of the similar image 82*a* belongs to the "2006, child, 4 years old" group. Therefore, the time difference is at least 19 years. Here, a description will be given assuming that the time difference is 19 years.

In the process of step S18, the date comparing unit 65 determines whether or not a time difference between the capture dates of the data of the target image 71*b* and the data of the similar image 82*a* is within the specified time interval.

In this case, the time difference of 19 years is obviously longer than the specified time interval of 10 years. This means that the subjects of the target image 71*b* and the similar image 82*a* have similar faces beyond the period (of 19 years, in this case) over the specified time interval of 10 years, and it can be determined that the subject in the target image is most likely the parent, while the subject in the similar image 82*a* is the child. In such a case, it is difficult to classify the target image data 71*c* accurately.

Therefore, in this case, NO is determined in step S18, control goes back to step S14, another similar image is searched for, and the processes thereafter are repeated.

This time, in the process of step S14, it is assumed that the data of the existing image 82*b* stored in the parent group storing unit 81*b* is found as data of a similar image to the target image 71*b*, for example.

In this case, YES is determined in the process of step S15, and the age confirmation unit 64 determines whether or not the age (4 years old) of the subject (parent) of the target image 71*b* is within a predetermined target age range in the process of step S16.

Since it has been assumed here that the target age range is set between 0 and 5 years old as described above, YES is determined in the process of step S16, and control proceeds to step S17.

In the process of step S17, the date comparing unit 65 computes a time difference between the capture dates of the data of the target image 71*b* and the data of the similar image 82*b*.

As shown in FIG. 4, the capture date of the data of the target image 71*b* is January 1986. On the other hand, the capture date of the data of the similar image 82*b* is, though not explicitly shown in FIG. 4, at least in the year 1986, since the data of the similar image 82*b* belongs to the "1986, parent, 4 years old" group. Therefore, the time difference is at most 11 months. Here, a description will be given assuming that the time difference is 11 months.

In the process of step S18, the date comparing unit 65 determines whether or not a time difference between the capture dates of the data of the target image 71*b* and the data of the similar image 82*b* is within the specified time interval.

In this case, the time difference of 11 months is obviously shorter than the specified time interval of 10 years. This means that the subjects of the target image 71*b* and the similar image 82*b* have similar faces within a short period (of 11 months, in this case) not exceeding the specified time interval, and it can be determined that the subjects of the target image 71*b* and the similar image 82*b* are the same person, i.e., the parent.

Thus, YES is determined in the process of step S18, the grouping unit 66 classifies the data of the target image 71*b* into the "1986, parent, 4 years old" group and stores it in the parent group storing unit 81*b* in the process of step S19.

With this, the grouping determination processing ends.

After that, it is assumed that the grouping determination processing starts over again, the target image 71*d* is read from the target image storing unit 51, and the face detection unit 61 attempts to detect a face region in the process of step S11.

In this case, since the face region 73*d* is detected as shown in FIG. 4, YES is determined in the process of step S12, and the age recognition unit 62 recognizes that the age of the subject (parent) of the target image is 14 years old based on data of the face region 73*d* in the process of step S13.

In the process of step S14, the similar image search unit 63 searches for data of an existing image having a face region similar to the face region 73*d* as data of a similar image to the target image from among data of a plurality of existing images stored in the existing image storing unit 52.

Here, though not shown in FIG. 4, it is assumed that the miscellaneous group storing unit 81*c* stores data of a similar image, and that the data is found.

In this case, YES is determined in the process of step S15, and the age confirmation unit 64 determines whether or not the age (14 years old) of the subject (parent) of the target image 71*d* is within a predetermined target age range in the process of step S16.

Since it has been assumed here that the target age range is set between 0 and 5 years old as described above, NO is determined in the process of step S16, and control proceeds to step S20.

In step S20, the grouping unit 66 classifies the data of the target image 71*d* into the "miscellaneous" group and stores it in the miscellaneous group storing unit 81*c*.

With this, the grouping determination processing ends.

As in an embodiment of the present invention described above with reference to FIGS. 1 to 4, an image capturing apparatus 1 is provided with a face detection unit 61, an age recognition unit 62, a similar image search unit 63, an age confirmation unit 64, a date comparing unit 65, and a grouping unit 66 (See FIG. 2).

The face detection unit 61 detects a region including a subject's face in a target image as a face region using captured image data that can identify a capture date thereof as the target image data.

The age recognition unit 62 recognizes the age of the subject in the target image based on the face region data.

The similar image search unit 63 searches for data of an existing image having a face region similar to the face region detected by the face detection unit 61 as similar image data from among data of a plurality of existing images that can respectively identify capture dates thereof, each of which belongs to one of a plurality of groups.

The age confirmation unit 64 confirms whether or not the age of the subject in the target image recognized by the age recognition unit 62 is within a predetermined first range (target age range).

The date comparing unit 65, in a case in which the age of the subject in the target image is within the first range, acquires a time difference between the capture dates of the target image data and the similar image data and compares the time difference and a predetermined second range (specified time interval).

As a result of the comparison by the date comparing unit 65, in a case in which the time difference is within the second range, the grouping unit 66 classifies the target image data into the same group as the group to which the similar image data belongs.

Here, what is meant by "the time difference is within the second range" is that the subjects of the target image and the similar image have similar faces in a short period within the second range. That is, it is possible to determine that the subjects of the target image and the similar image are the same person. Therefore, in such a case, the target image data is classified into the same group as the group to which the similar image data belongs.

On the other hand, what is meant by "the time difference is outside the second range" is that the subjects of the target image and the similar image have similar faces beyond the period over the second range, e.g., 10 years. That is, the subjects of the target image and the similar image are most likely different from each other, but in a close relationship such as parent-child or siblings. In such a case, since it is difficult to classify the target image data accurately, the target image data is not classified into the same group as the group to which the similar image data belongs.

In this way, it becomes possible to classify data of images respectively including different subjects having similar faces into different groups with high accuracy.

It should be noted that the present invention is not limited to the embodiment described above, and modifications and improvements thereto within a scope in which an object of the present invention can be realized, are included in the invention.

For example, in embodiments described above, although the target image data has been described as still image data, the target image data is not limited to this and can be moving image data. In this case, which is not illustrated in the drawings, the image capturing apparatus 1 can carry out the grouping determination processing of FIG. 4 or the like on data of a predetermined frame including a subject from among frame images or the like constituting the moving image, or on data of a thumbnail image of the moving image.

Furthermore, in the embodiment described above, although it has been described that the target image storing unit 51 and the existing image storing unit 52 are included in the storing unit 19 of the image capturing apparatus 1, the present invention is not limited to this. For example, the target image storing unit 51 and the existing image storing unit 52 can be included in an external server, and the target image data and the existing image data can be input therefrom and output thereto via the communication unit 20 and the Internet.

Furthermore, in the embodiment described above, it has been described that the date comparing unit 65 determines whether or not time difference between the capture dates of the existing image data retrieved by the similar image search unit 63 and the target image data from which a face region is detected by the face detection unit 61, is within the specified time interval.

In the embodiment described above, the specified time interval has been set to 2 years or 10 years, but the specified time interval is not limited to this and can be arbitrarily set by a user, as described above.

However, the specified time interval determined by the date comparing unit 65 depends on the accuracy of the age recognition by the age recognition unit 62. Therefore, when the specified time interval is set to be short, it is preferable to increase the age recognition accuracy of the age recognition unit 62 as high as possible.

Furthermore, in the embodiment described above, it has been described that the age confirmation unit 64 determines whether or not the age of the subject in the target image recognized by the age recognition unit 62 is within a predetermined target age range.

In the embodiment described above, the target age range has been set to a range between 0 and 5 years old, but the target age range is not limited to this and can be arbitrarily set by a user, as described above.

For example, in a case in which it is desired that images of brothers 2 years apart, taken when in elementary school days, should not be put in the same group, it is preferable for a user to set the specified time interval used by the date comparing unit 65 to 2 years and the target age range used by the age confirmation unit 64 to a range between 6 and 12 years old. With this, it can be possible to classify images of brothers having similar faces, taken when in elementary school days, into different groups of the elder and the younger.

Furthermore, in the embodiment described above, although a single age range has been fixedly employed, the present invention is not limited to this, and a plurality of age ranges combined or switched as appropriate can be employed.

Furthermore, in the embodiment described above, although the grouping determination processing has been carried out according to the flowchart of FIG. 4, the present invention is not limited to this.

This means that, in the present specification, the steps describing the program stored in the storage medium include not only the processing executed in a time series following this order, but also processing executed in parallel or individually, which is not necessarily executed in a time series.

More specifically, for example, the process of step S16 of confirming an age by the age confirmation unit 64 is not necessarily executed in the order of FIG. 2.

Furthermore, by omitting the process of step S16 of confirming age by the age confirmation unit 64, it becomes possible for the grouping unit 66 to classify target images including subjects of all ages after determining whether or not the time difference between the capture dates of the target image data and the similar image data is within the specified time interval.

Furthermore, in the embodiment described above, it has been described that the grouping determination processing is terminated if no more similar image data is found by the similar image search unit 63 in data of a plurality of existing images stored in the existing image storing unit 52.

In this case, although the target image data has been stored in the existing image storing unit 52 without being classified to any group, the present invention is not limited to this, as described above, and the target image data can be stored in the existing image storing unit 52 after being classified into a newly created group.

Furthermore, in the embodiment described above, it has been described that the grouping determination processing is terminated if no face region is detected by the face detection unit 61 due to a reason such as there being no subjects included in the target image.

In this case, although the target image data has been stored in the existing image storing unit 52 without being classified to any group, the present invention is not limited to this, as described above, and the target image data can be stored in the existing image storing unit 52 after being classified into a newly created group.

Furthermore, in the abovementioned embodiment described above, the image processing apparatus according to the present invention is configured by an image capturing processing apparatus such as a digital camera. However, the present invention is not limited to an image capturing processing apparatus and can be applied to any electronic device that can carry out the image processing described above regardless of whether the device has or has not an image capturing function (the target image data may be acquired from another device). More specifically, the present invention can be applied to a personal computer, a video camera, a portable navigation device, a portable game device, and the like.

The series of processes described above can be executed by hardware and also can be executed by software.

In a case in which the series of processes are to be executed by software, a program configuring the software is installed from a network or a storage medium into a computer or the like. The computer may be a computer embedded in dedicated hardware. Alternatively, the computer may be capable of executing various functions by installing various programs, i.e., a general-purpose personal computer, for example.

The storage medium containing the program may be constituted by the removable media 31 of FIG. 1. Also, the storage medium containing the program may be constituted by a storage medium or the like supplied to the user in a state incorporated in the device main body in advance. The removable media is composed of a magnetic disk (including a floppy disk), an optical disk, a magnetic optical disk, or the like, for example. The optical disk is composed of a CD-ROM (Compact Disk-Read Only Memory), a DVD (Digital Versatile Disk), or the like. The magnetic optical disk is composed of an MD (Mini-Disk) or the like. The storage medium, supplied in a state in which it is incorporated in the device main body in advance, may include the ROM 12 of FIG. 1 in which the program is stored, a hard disk included in the storing unit 19 of FIG. 1, and the like, for example.

What is claimed is:

1. An image processing apparatus, comprising:
a face detection unit that detects a region including a face of a subject in a target image, as a face region, using data of a captured image that can identify a capture date thereof, as data of the target image;
an age recognition unit that recognize an age of the subject in the target image based on the face region detected by the face detection unit;
a similar image search unit that searches for data of an existing image having a face region similar to the face region detected by the face detection unit, as data of a similar image, from among data of a plurality of existing images that can respectively identify capture dates thereof, each of which belongs to one of a plurality of groups;
an age confirmation unit that confirms whether or not the age of the subject in the target image recognized by the age recognition unit is within a predetermined first range;
a date comparing unit that, in a case in which the age confirmation unit confirms that the age of the subject in the target image is within the first range, acquires a difference between a first capture date of the data of the target image and a second capture date of the data of the similar image found by the similar image search unit, and compares the difference with a predetermined second range; and
a grouping unit that classifies the data of the target image into the same group as the group to which the data of the similar image belongs, in a case in which the difference is within the second range according to a result of a comparison by the date comparing unit.

2. The image processing apparatus according to claim 1, wherein in a case in which the difference is outside the second range according to the result of the comparison by the date comparing unit, (i) processing carried out by the similar image search unit that searches for data of another similar image and the date comparing unit that acquires the difference using a capture date of data of the other similar image as the second capture date and compares the difference with the second range is repeated until the difference falls within the second range, or until there is no more data of an existing image found as another similar image data by the similar image search unit, and (ii) the grouping unit does not allow classification of the data of the target image, or creates a new group and classifies the data of the target image into the new group, in a case where there is no more existing image data retrieved by the similar image search unit as data of another similar image.

3. The image processing apparatus according to claim 1, wherein the grouping unit classifies the data of the target image into a group other than the group to which the data of the existing image, including subjects of ages within the first range, belongs, in a case in which it is confirmed by the age confirmation unit that the age of the subject in the target image is outside the first range.

4. The image processing apparatus according to claim 1, wherein the grouping unit does not allow classification of the data of the target image, or creates a new group and classifies the data of the target image into the new group, in a case where the face detection unit does not detect the face region.

5. An image processing method carried out by an image processing apparatus to execute image processing by using data of a target image as a target, the method comprising:
detecting a region including a face of a subject in the target image, as a face region, using data of a captured image that can identify a capture date thereof, as the data of the target image;
recognizing an age of the subject in the target image based on the detected face region;
searching for data of an existing image having a face region similar to the detected face region detected, as data of a similar image, from among data of a plurality of existing images that can respectively identify capture dates thereof, each of which belongs to one of a plurality of groups;
determining whether or not the recognized age of the subject in the target image is within a predetermined first range;
acquiring, in a case in which it is determined that the age of the subject in the target image is within the first range, a difference between a first capture date of the data of the target image and a second capture date of the data of the similar image, and comparing the difference with a predetermined second range; and
classifying the data of the target image into the same group as the group to which the data of the similar image belongs, in a case in which the difference is within the second range according to a result of the comparison.

6. A non-transitory storage medium having stored therein a program executable by a computer that controls an image processing apparatus to carry out image processing on data of a target image as a target, the program causing the computer to perform functions comprising:
detecting a region including a face of a subject in the target image, as a face region, using data of a captured image that can identify a capture date thereof as the data of the target image;
recognizing an age of the subject in the target image based on the detected face region;
searching for data of an existing image having a face region similar to the detected face region, as data of a similar image, from among data of a plurality of existing images that can respectively identify capture dates thereof, each of which belongs to one of a plurality of groups;
determining whether or not the recognized age of the subject in the target image is within a predetermined first range;
acquiring, in a case in which it is determined that the age of the subject in the target image is within the first range, a difference between a first capture date of the data of the target image and a second capture date of the data of the similar image, and comparing the difference with a predetermined second range; and classifying the data of the target image into the same group as the group to which the data of the similar image belongs, in a case in which the difference is within the second range according to a result of the comparison.

* * * * *